United States Patent [19]

Hashimoto

[11] Patent Number: 4,750,006
[45] Date of Patent: Jun. 7, 1988

[54] PLATEN FOR RECORDING DEVICE
[75] Inventor: Kenichiro Hashimoto, Kawasaki, Japan
[73] Assignee: Canon Kabushiki Kaisha, Tokyo, Japan
[21] Appl. No.: 56,327
[22] Filed: May 28, 1987

Related U.S. Application Data
[63] Continuation of Ser. No. 674,676, Nov. 26, 1984, abandoned.

[30] Foreign Application Priority Data
Nov. 29, 1983 [JP] Japan .................................. 58-223146
[51] Int. Cl.$^4$ ...................... G01D 15/10; B41J 11/04; B65D 65/28
[52] U.S. Cl. ................ 346/76 PH; 346/146; 346/134; 428/43
[58] Field of Search .............. 346/76 PH, 134; 400/648, 662, 120; 428/43

[56] References Cited
U.S. PATENT DOCUMENTS

| | | | |
|---|---|---|---|
| 3,812,002 | 5/1974 | Lurie | 428/43 |
| 3,939,325 | 2/1976 | Otani et al. | 219/216 |
| 4,030,588 | 6/1977 | Hanagata et al. | 346/76 R X |
| 4,039,065 | 8/1977 | Seri et al. | 346/76 R X |
| 4,300,844 | 11/1981 | Keil | 400/120 |
| 4,421,428 | 12/1983 | Noda et al. | . |
| 4,496,616 | 1/1985 | McLoughlin et al. | 428/36 X |

FOREIGN PATENT DOCUMENTS 59-54582   3/1984   Japan .................................. 400/120

OTHER PUBLICATIONS
IBM Technical Disclosure Bulletin, vol. 22, No. 12, "Print Head Structure", Cahill et al., May 1980.

Primary Examiner—E. A. Goldberg
Assistant Examiner—Gerald E. Preston
Attorney, Agent, or Firm—Fitzpatrick, Cella, Harper & Scinto

[57] ABSTRACT

A platen for a recording device includes a main body of the platen having a flat surface part opposing a recording head and a guiding part for a recording sheet. The guide part is continuous with the flat surface part and inclined so as to secure smooth advancement of the recording sheet. A continuous smooth layer of a material having a frictional coefficient smaller than that of the platen main body is integrally formed on the upper surface of the flat surface part and guiding part.

6 Claims, 3 Drawing Sheets

PLATEN FOR RECORDING DEVICE

This application is a continuation-in-part of application Ser. No. 674,676 filed Nov. 26, 1984, now abandoned.

BACKGROUND OF THE INVENTION

1. Field of the Invention

This invention relates to a platen for use in a recording device, and also to a method for manufacturing the same.

2. Description of Prior Art

A non-impact type recording system, such as, for example, a heat-transfer type recording device, performs its recording in a dot-pattern by: (1) repeated operations of press-contacting a heat-generating section provided on a recording head to a recording sheet laid on a platen; (2) moving the recording head in its printing direction, while driving the heat generating section, thereby performing the recording of one line; and (3) forwarding the recording sheet by one increment in the line direction.

Therefore, in order to carry out adequate recording by this system, it is necessary that the heat generating section of the recording head be in perfect surface-contact with the recording sheet, incremental feed maintaining the appropriate pressure therewith. Further, the must always be constant.

For satisfying such conditions, there has so far been used widely, in this type of the recording device, a platen of a construction as shown in FIG. 1 of the accompanying drawing.

In the drawing, the platen 1 has a rectangular planar shape and is made of a material such as, for instance, rubber having a rubber hardness of 50° or so. The platen is fixed on a frame 2 (a supporting member) by various methods such as gluing, two-sided adhesive tape, and others. The surface of the platen 1, at its side facing the recording head 5, is covered with a Teflon sheet 3 having a small frictional coefficient. The Teflon sheet 3 is fixed at its upper end (part 3a) and lower end (part 3b) onto the surfaces of the frame 2, on the upper and lower sides of the platen 1, with two-sided adhesive tape.

When recording, the recording sheet 4 is press-contacted to the Teflon sheet 3 fixed on the surface of the platen 1, and the recording operation is effected in accordance with the above-mentioned procedures.

According to the above-described construction, since the platen 1 is formed of rubber having elasticity, the entire surface of the heat generating section in the recording head 5 can be brought into good contact with the recording sheet 4 at the time of the recording. Moreover, since the Teflon sheet produces low friction sliding against the recording head 5, the recording head 5 can be prevented.

In addition, the small frictional coefficient of the Teflon sheet 3 provides better sliding of the recording sheet 4 on and along the platen 1, when forwarding the recording sheet in the line direction, preventing disturbance in the forwarding pitch in the line direction.

Further, the part of the Teflon sheet 3 extending at an incline below the platen 1 serves to guide the recording sheet 4, providing smooth insertion of the recording sheet 4, between the platen 1 and the recording head 5 to its designated position.

In the above-described construction, however, the manual fastening of the teflon sheet 3 onto the surface of the platen 1, at the time of assembly, without incurring creases and slack in the sheet, requires a high degree of technique. Therefore, these creases and slack tend to occur readily at the time of assembly. Further, because the adhesive strength between the Teflon sheet 3 and the platen 1 is weak, there is a high possibility of such creases and slack occurring when the Teflon sheet 3 is squeezed by the recording head 5.

When the creases and slack are created in the Teflon sheet 3, the heat generating section of the recording head 5 and the recording sheet 4 at this portion of the Teflon sheet 3 make poor contact between then with the consequence that the recorded portion becomes blurred, and it is difficult to obtain a favorable recording. Further, at the creased or slackened portion, the Teflon sheet 3 tends to break or wear-out. Such breakage at one small portion spreads over the surrounding area in a short period of time, so that the Teflon sheet 3 becomes useless within a short time.

Moreover, manual fixing the Teflon sheet 3 as mentioned above is not suitable for industrialized mass-production, and disadvantageously pushes up the manufacturing cost.

With a view to eliminating the above-described disadvantages inherent in the conventional platen for the recording apparatus, various proposals have been made for a platen material having: appropriate elasticity, small frictional coefficient on its surface, and high mechanical strength at the surface layer constituting the surface of the platen.

Examples of the proposed platen materials are as follows: one composed of a rubber sheet with its surface having been chemically treated and a Teflon sheet adhere to the surface of the thus treated rubber sheet, thereby increasing the adhesive strength between the Teflon sheet and the rubber sheet; one composed of a Teflon sheet and a rubber sheet, both being simultaneously molded to increase the degree of contact of the Teflon sheet to the rubber sheet; one composed of a rubber sheet alone with its surface having been subject to a fluorine-substituting treatment, thereby reducing the frictional coefficient of its surface to that of Teflon; or others.

According to the method for manufacturing the platen using these materials, a rectangular planar rubber sheet 6 as shown in FIG. 2A is first formed of a rubber material. Then, one surface of the rubber sheet 6 is joined with the Teflon sheet in a manner to obtain high mechanical strength as mentioned above. Alternatively, it is subjected to the fluorine-substituting treatment, thereby forming a surface layer 7 with a small frictional coefficient on the surface of the rubber sheet. Thereafter, as shown in FIG. 2C, the treated rubber sheet 6 is served along solid lines A at equally spaced intervals corresponding to the height of the resulting platen to thereby obtain individual platens 8. The solid lines A are parallel to one another and extend in the direction perpendicular to the longitudinal direction of the rubber sheet.

In view, however, of the fact that the thus manufactured platen 8 is rectangular in its cross-section, when it is fixed onto the frame 2 in such a manner that its surface layer 7 is projected from the front face of the frame 2 with a predetermined height as shown in FIG. 3, the lower and surface 8a of the platen 8 projects perpendicularly from the front surface of the frame 2 for the above-mentioned predetermined height.

As a result, when the recording sheet 4 is being inserted between the recording head 5 and the platen 8, the leading edge of the recording sheet 4 occasionally collides with the lower end face 8a of the platen 8, and is folded or otherwise crimped, preventing insertion between the recording head and the platen.

SUMMARY OF THE INVENTION

It is therefore an object of the present invention to provide a platen for a recording device which is simple in construction and is capable of smoothly forwarding a recording sheet.

It is another object of the present invention to provide an improved method for manufacturing the platen for the recording device.

It is still another object of the present invention to provide a platen for a recording device, which can be easily assembled.

It is other object of the present invention to provide a platen for a recording device, which is made suitable for industrialized mass-production.

It is still other object of the present invention to provide a platen for a recording device with improved durability.

It is a further object of the present invention to provide a platen for a recording device which can be manufactured with a reduced total manufacturing cost.

The foregoing objects, and other objects, as well as specific construction and function of the platen for a recording device according to the present invention will become more apparent and understandable from the following detailed description thereof, when read in conjunction with the accompanying drawing.

DETAILED DESCRIPTION OF PREFERRED EMBODIMENT

Figure 1:
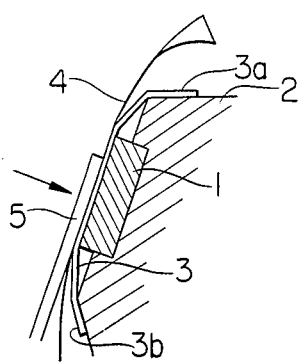
FIG. 1 is a cross-sectional view for explaining a conventional platen and its operational structure.
Figure 2A:
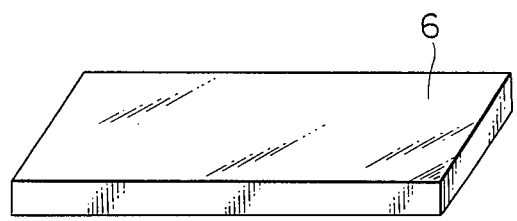
FIGS. 2A, 2B and 2C are perspective views for explaining a method for manufacturing other types of the conventional platens.
Figure 2B:
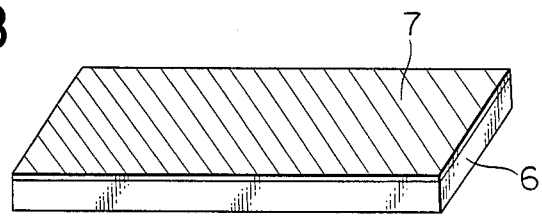
Figure 2C:
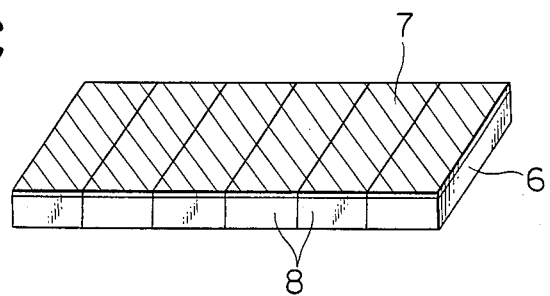
Figure 3:
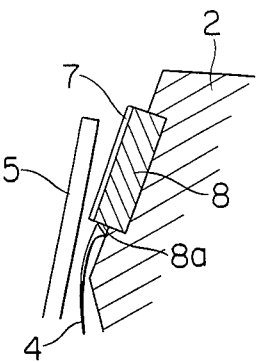
FIG. 3 is a cross-sectional view showing the platen obtained by the method shown in FIGS. 2A to 2C, its operational structure, and the a state of a recording sheet having collided with the lower end face of the platen.

In the following, the present invention will be described in detail with reference to the preferred embodiment thereof shown in FIGS. 4 to 8 of the accompanying drawing. It should be noted that those parts which are identical with those in FIGS. 1 to 3 are designated by the same reference numerals.

Figure 4:
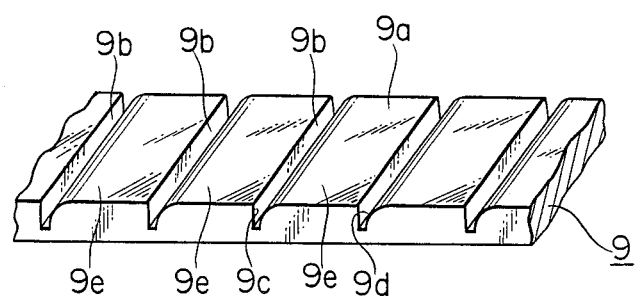
FIGS. 4 and 5 are respectively a perspective view and a cross-sectional view for explaining the method for manufacturing the platen according to one preferred embodiment of the present invention.
Figure 5:
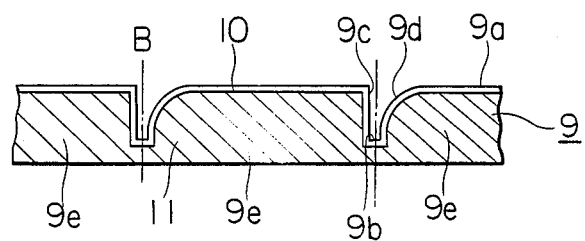

Referring to FIGS. 4 and 5, the method for manufacturing the platen for the recording device according to the present invention will be explained hereinbelow.

An integral collective base material of platens (or a platen array) 9, as shown in FIG. 4, is formed of an elastic material such as natural rubber or synthetic rubber. As illustrated, the collective base material 9 has a rectangular planar shape. A plurality of rectilinear ditches 9b are formed in the upper surface 9a of the array 9 parallel to one another at equally spaced intervals in the direction perpendicular to the longitudinal direction of the rectangular collective base material. The array 9 is sectioned by these ditches 9b into individual platen blocks 9e. The upper flat surface 9a of each platen block 9e constitutes the opposing surface to the recording head 5.

The ditch 9b is formed in such a manner that, of the two lateral surfaces 9c and 9d, the lateral surface 9c is formed in a plane which intersects substantially orthogonally with the upper flat surface 9a, while the other lateral surface 9d is in a substantially quartered arc and is continous with the flat surface 9a bowing to form a curved surface such that the ditch 9b is open toward the upper flat surface 9a. Also, the cross-sectional shape of this ditch 9b in the direction orthogonal to the extending direction of this ditch 9b, is tapered to form a substantially triangular shape with its one side being curved.

Subsequently, the entire surface 9a of the array 9 of the above-described configuration, including the ditches 9b, is subject to the fluorine-substituting treatment, forming thereon a flat and smooth layer 10, as shown in FIG. 5, having a much smaller frictional coefficient than rubber. After this, the platen array 9 is severed into individual platen blocks 9e at the connection thereof along thd ditch 9b, as shown by dot-and-dash lines B in FIG. 5, whereby a single body 11 of the platen is obtained.

Figure 6:
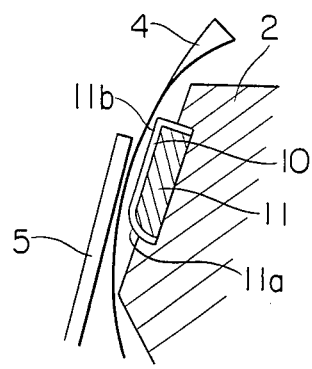
FIG. 6 is a cross-sectional view showing the platen and its operational structure according to the preferred embodiment of the present invention.

The platen 11 has a cross-sectional shape of a plate with one end part 11a being curved in a substantially quartered arc, conforming to the lateral surface 9d of the aforementioned ditch 9b, as shown in FIG. 6. The platen is fixed to the frame 2 by an adhesive agent, etc. in such a manner that the flat surface part 11b at the side of the flat and smooth layer 10 faces outward, the end part 11a thereof faces downward, and the flat surface part 11b projects from the front face of the frame 2 to a predetermined height.

As described in the foregoing, the platen 11 constitutes a part of the recording device. When a recording sheet 4 is advanced upward and first comes into contact with the end part 11a of the platen 11, this curved end part 11a diverts the forward edge of the recording sheet 4 by its curvature, thereby acting as a guiding part for smooth introduction of the recording sheet 4 between the recording head 5 and the flat surface part 11b opposite to it.

Furthermore, the flat and smooth layer 10 of the platen 11 is integrally formed with the rubber material constituting the main body of the platen 11 by the fluorine-substituting treatment. The layer 10 therefore has a small frictional coefficient and appropriate elasticity, hence it has high mechanical strength and durability against the slide-movement of the recording head 5.

Further, according to the above-described method for manufacturing the platen 11, the single body of the platen is formed by the three steps of: forming the collective base material (or array) 9 for the platen as shown in FIG. 4; forming the flat and smooth layer 10 by the fluorine-substituting treatment as shown in FIG. 5; and severing the platen array 9 along the ditches 9b formed therein. These three steps are all suitable for industrialized mass-production.

For assembly of the platen 11 into the frame 2, the platen 11 only requires fixing to the frame 2 with an adhesive agent, etc., so there is no necessity for employing the highly technical work of sticking the Teflon sheet onto the surface of the platen for its protection, as has been done heretofore.

Figure 7:
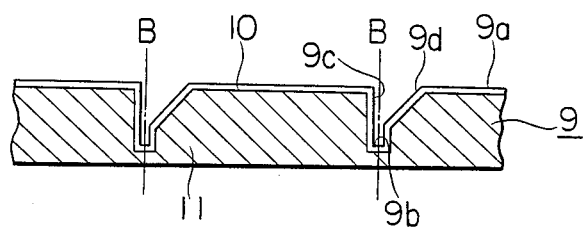
FIGS. 7 and 8 are cross-sectional views showing alternative platen shapes according to this embodiment of the present invention.
Figure 8:
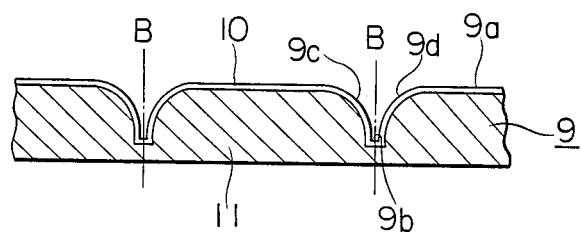

The platen 11 is not limited to the shape of the above-described embodiment, but may be of any other shapes, provided that at least the lower end part of the platen is so formed as to guide the recording sheet 4 between the recording head 5 and the platen 11 without its forward end colliding with the lower end part of the platen at the time of insertion of the recording sheet for setting it in position. For instance, the ditch 9b in the array 9 is formed as shown in FIG. 7, wherein one lateral surface 9d of the ditch 9b is inclined with respect to the upper flat surface 9a so as to cause at least a portion of the lower end part 11a of the platen 11 projecting from the frame to be inclined at an obtuse angle with respect to the flat surface 11b. It is further possible to form the ditch 9b in the platen array 9 as shown in FIG. 8, wherein the platen 11 is formed in a planar shape with both lateral surfaces 9c and 9d of the ditch 9b defining a substantially quartered arcuate surface so that both upper and lower end parts are continuous with the flat surface 9a therebetween.

In the preferred embodiments of the present invention, the platen is formed of rubber, however any other appropriate elastic material may also be used.

Further, according to the embodiments of the present invention, the flat and smooth layer 10, having a small frictional coefficient, is formed by subjecting the platen array 9 to the fluorine-substituting treatment. The the surface layer 10 may be foremd by alternative methods such as joining a Teflon sheet to the flat surface 9a of the platen array 9 in such a way that sufficiently secures high mechanical strength. Furthermore, materials of small frictional other than Teflon may be used for the purpose of the present invention.

What is claimed is:

1. A base material for forming a plurality of platens for a recording device having a recording head, said base material comprising:
   a base body having a continuous first surface including a plurality of flat co-planar portions and a plurality of ditches, each said ditch being disposed between and separating adjacent flat portions of said base body, wherein said ditches include two side walls that are parallel in the plane of said flat portions and a flat bottom surface separating said side walls at the bottom of each said ditch, said side walls being farther apart at said flat portion than at said bottom surface; and
   a continuous smooth surface layer coating said continuous first surface and having a coefficient of friction lower than that of said base body.

2. A base material as set forth in claim 1, wherein each said ditch includes a first side wall substantially perpendicular to said flat portions, and a second accurately curved side wall.

3. A base material as set forth in claim 1, wherein each said ditch includes a first side wall substantially perpendicular to said flat portions, and a second side wall inclined to form an angle with respect to said flat portions.

4. A base material as set forth in claim 1, wherein both of said side walls are accurately curved surfaces.

5. A base material as set forth in claim 1, wherein said continuous smooth surface layer is formed by a fluorine-substituting treatment.

6. A base material as set forth in claim 1, wherein said continous smooth layer is a Teflon sheet.

* * * * *

UNITED STATES PATENT AND TRADEMARK OFFICE
CERTIFICATE OF CORRECTION

PATENT NO. : 4,750,006

DATED : June 7, 1988

INVENTOR(S) : KENICHIRO HASHIMOTO

It is certified that error appears in the above-identified patent and that said Letters Patent is hereby corrected as shown below:

COLUMN 1

Line 27, "incremetal feed" should be deleted.
Line 29, "must" should read --incremental feed of the recording sheet in the line direction must--.
Line 55, "head 5, the recording head 5" should read --head, wear of the recording head 5--.
Line 65, "sheet 4," should read --sheet 4--.
Line 68, "teflon" should read --Teflon--.

COLUMN 2

Line 12, "between then" should be deleted.
Line 16, "wear-out." should read --wear out.--.
Line 20, "manual" should read --manually--.
Line 22, "disadvantaeously" should read --disadvantageously--.
Line 34, "here" should read --hered--.
Line 40, "subject" should read --subjected--.
Line 55, "served" should read --severed--.
Line 66, "and" should read --end--.

COLUMN 3

Line 19, "other" should read --another--.
Line 22, "other" should read --another--.
Line 43, "a" (first occurrence) should be deleted.

UNITED STATES PATENT AND TRADEMARK OFFICE
CERTIFICATE OF CORRECTION

PATENT NO. : 4,750,006
DATED : June 7, 1988
INVENTOR(S) : KENICHIRO HASHIMOTO

It is certified that error appears in the above-identified patent and that said Letters Patent is hereby corrected as shown below:

COLUMN 4

Line 19, "continous" should read --continuous--.
    Line 22, "ditch 9b" should read --ditch 9b,--.
    Line 28, "subject" should read --subjected--.
    Line 33, "thd" should read --the--.

COLUMN 5

Line 35, "The the" should read --The--.
    Line 36, "foremd" should read --formed--.

COLUMN 6

Line 2, "frictional other" should read --frictional coefficient other--.

Signed and Sealed this

Twenty-first Day of March, 1989

Attest:

DONALD J. QUIGG

Attesting Officer      Commissioner of Patents and Trademarks